(12) United States Patent
Kobori (10) Patent No.: US 9,410,824 B2
(45) Date of Patent: Aug. 9, 2016

(54) ELECTROMAGNETIC INDUCTION POSITION DETECTION SENSOR

(71) Applicant: Wacom Co., Ltd., Saitama (JP)

(72) Inventor: Takeshi Kobori, Ibaraki (JP)

(73) Assignee: Wacom Co., Ltd., Saitama (JP)

( * ) Notice: Subject to any disclaimer, the term of this patent is extended or adjusted under 35 U.S.C. 154(b) by 105 days.

(21) Appl. No.: 13/973,763

(22) Filed: Aug. 22, 2013

(65) Prior Publication Data

US 2014/0084907 A1    Mar. 27, 2014

(30) Foreign Application Priority Data

Sep. 27, 2012  (JP) .................. 2012-214345

(51) Int. Cl.
*G01B 7/14* (2006.01)
*G01D 5/20* (2006.01)
(Continued)

(52) U.S. Cl.
CPC .............. *G01D 5/2073* (2013.01); *G06F 3/046* (2013.01); *H01Q 7/00* (2013.01)

(58) Field of Classification Search
CPC ...... G01B 7/143; G01B 7/004; G01D 5/2073; G06F 3/046; G08C 21/00; H01Q 7/00; H01Q 21/00
USPC .................. 324/207.11–207.17, 207.24, 654, 324/207.26, 228–243, 207.18, 207.22, 324/207.25, 247, 260, 262, 655; 343/173, 343/741, 742, 867, 876, 732, 866, 895; 345/157, 173, 179, 180, 174; 702/95, 702/150; 178/18.01, 18.03, 18.07, 18.08, 178/19.01, 19.03, 19.06
See application file for complete search history.

(56) References Cited

U.S. PATENT DOCUMENTS 5,045,645 A * 9/1991 Hoendervoogt ........ G06F 3/046
                                                    178/19.07
5,548,306 A * 8/1996 Yates, IV ................ G06F 3/044
                                                    345/174
(Continued)

FOREIGN PATENT DOCUMENTS

EP    2 031 543 A1    9/2008
JP    3-201018 A      9/1991
(Continued)

OTHER PUBLICATIONS

Extended European Search Report dated Feb. 13, 2014, for corresponding European Application No. 13186271.6-1904, 5 pages.

(Continued)

*Primary Examiner* — Arleen M Vazquez
*Assistant Examiner* — Steven Yeninas
(74) *Attorney, Agent, or Firm* — Seed Intellectual Property Law Group PLLC (57) ABSTRACT

An electromagnetic induction position detection sensor includes a plurality of loop coils, each being an N-turn loop coil formed by winding a conductor N times (N is an integer equal to or greater than 2), and each coil turn having long side portions that are separated by a predetermined width and that are parallel to each other. The loop coils are arranged at predetermined intervals in a predetermined direction intersecting the long side portions of the loop coils. The width of at least one of the N turns of the Mth loop coil from the edge portion of the sensor in the predetermined direction (M is an integer equal to or greater than 2) is larger than the predetermined width, with the long side portion of this turn of the Mth loop coil arranged more outward than the long side portions of the other turns of the Mth loop coil.

20 Claims, 8 Drawing Sheets (51) Int. Cl.
*G06F 3/046* (2006.01)
*H01Q 7/00* (2006.01)

(56) References Cited

U.S. PATENT DOCUMENTS

| | | | | |
|---|---|---|---|---|
| 5,635,684 A * | 6/1997 | Fukuzaki | ................ | G06F 3/046 178/18.07 |
| 5,815,091 A * | 9/1998 | Dames | ................ | G01D 5/2073 324/207.17 |
| 6,335,618 B1 * | 1/2002 | Nahum | ................... | 324/207.17 |
| 7,307,616 B2 * | 12/2007 | Katsuhito | ............... | G06F 3/046 178/18.07 |
| 7,646,379 B1 * | 1/2010 | Drennan | ............. | G06F 3/03545 178/18.01 |
| 8,183,476 B2 * | 5/2012 | Fukushima | ......... | G06F 3/03545 178/18.01 |
| 2005/0083237 A1 * | 4/2005 | Uen et al. | ...................... | 343/742 |
| 2006/0267580 A1 * | 11/2006 | Fukushima et al. | ..... | 324/207.13 |
| 2009/0058607 A1 * | 3/2009 | Hou et al. | .................... | 340/10.1 |
| 2011/0006759 A1 | 1/2011 | Fukushima | | |
| 2011/0025349 A1 * | 2/2011 | Howard | ............... | G01D 5/2073 324/655 |
| 2014/0117980 A1 * | 5/2014 | Ely | ......................... | G01B 7/30 324/207.17 |
| 2015/0102806 A1 * | 4/2015 | Tsuchihashi | ............ | G06F 3/046 324/207.17 |

FOREIGN PATENT DOCUMENTS

| | | |
|---|---|---|
| JP | 05181594 A | 7/1993 |
| JP | 2006-309308 A | 11/2006 |
| JP | 2007-047919 A | 2/2007 |

OTHER PUBLICATIONS

Japanese Office Action dated Apr. 27, 2016 for corresponding Japanese application No. 2012-214345, 4 pages.

\* cited by examiner

21X₁ (FIRST EXAMPLE)

FIG.6C

21X₁ (SECOND EXAMPLE)

FIG.6D

21X₁ (THIRD EXAMPLE)

ELECTROMAGNETIC INDUCTION POSITION DETECTION SENSOR

CROSS-REFERENCE TO RELATED APPLICATION

The present application claims priority under 35 U.S.C. 119(a) to Japanese Patent Application No. 2012-214345, filed Sep. 27, 2012, which is incorporated by reference herein.

BACKGROUND

1. Technical Field

The present invention relates to an indicated position detection sensor of an electromagnetic induction indicator position detector used as an input device of electronic equipment such as tablet terminal.

2. Description of the Related Art

Recent years have seen the use of electromagnetic induction position input devices as input devices for tablet terminals and intelligent mobile phone terminals called smartphones. These position input devices each include a position indicator and indicator position detector. The position indicator is in the shape of a pen (pen-shaped position indicator). The indicator position detector has an input surface, on which pointing operation is performed, and text, graphics and other information is entered using the pen-shaped position indicator. The pen-shaped position indicator includes a resonance circuit made up of a coil and capacitor. On the other hand, the indicator position detector includes a position detection sensor. The position detection sensor includes X- and Y-axis direction loop coil groups that overlap one another. The X-axis direction loop coil group is formed by arranging a plurality of loop coils horizontally (in the X-axis direction). The Y-axis direction loop coil group is formed by arranging a plurality of loop coils vertically (in the Y-axis direction).

Then, one loop coil is selected in a predetermined sequence from among the plurality of loop coils arranged in the position detection sensor area, after which a transmission signal is transmitted from the selected loop coil to the pen-shaped position indicator, thus allowing the capacitor of the pen-shaped position indicator to be charged. Next, the loop coil used for the transmission is connected to a reception circuit, thus receiving a signal from the resonance circuit of the pen-shaped position indicator and detecting the indicated position based on the reception signal. Such an exchange of signals is performed by sequentially changing the loop coils, thus allowing detection of the position indicated by the pen-shaped position indicator on the position detection sensor.

It should be noted that a calculation method based on the reception signal levels of three loop coils, i.e., the coil with the highest reception signal level from the pen-shaped position indicator, and the two other coils, one on each side of the above coil, is known as a calculation method for an electromagnetic induction position input device to calculate a position. Normally, the position of the pen-shaped position indicator is calculated based on the reception signals of three loop coils (three-point detection method). Further, Japanese Patent Laid-Open No. Hei 5-181594 described later discloses an invention that uses another calculation method in combination with the three-point detection method because it is difficult to obtain reception signals from three loop coils in the areas surrounding the position detection sensor (vertical and horizontal areas surrounding the position detection sensor). This method calculates the position of the pen-shaped position indicator based on reception signal levels of two loop coils (two-point detection method).

This two-point detection method makes it possible to reduce the size of the area surrounding the position detection sensor where it has been difficult to detect the position of the pen-shaped position indicator. In the areas near the edge portions of the position detection sensor that are further outside the areas surrounding the position detection sensor, it is possible to obtain a reception signal from only a single loop coil. Therefore, this area near the edge portions of the position detection sensor where the position indicated by the pen-shaped position indicator can be detected by only a single loop coil has been treated as a so-called disabled (invalid) area.

It should be noted that an electromagnetic induction position input device is used not only as an external input device for a PC (personal computer) but also as an input device for a tablet terminal and intelligent mobile phone terminal as described earlier. In this case, the electromagnetic induction position input device is arranged to be stacked on a display element such as LCD (liquid crystal display), thus allowing it to be integral with the tablet terminal PC or intelligent mobile phone terminal.

BRIEF SUMMARY

The detection method in related art to detect a position indicated by a pen-shaped position indicator at the edge portion of a position detection sensor calculates the position based on a predetermined relational formula that is dependent on the ratio of the reception signal levels of the two adjacent loop coils according to the two-point detection method. Here, we consider a position detection sensor in related art that includes a plurality of loop coils $X_0$, $X_1$, $X_2$ and so on, each having an X-axis direction width (horizontal width) D, arranged at pitches P in the X-axis direction, and a plurality of loop coils $Y_0$, $Y_1$, $Y_2$ and so on, each having a predetermined Y-axis direction width (vertical width), arranged at predetermined pitches as illustrated in FIG. 8A.

Figure 8A:
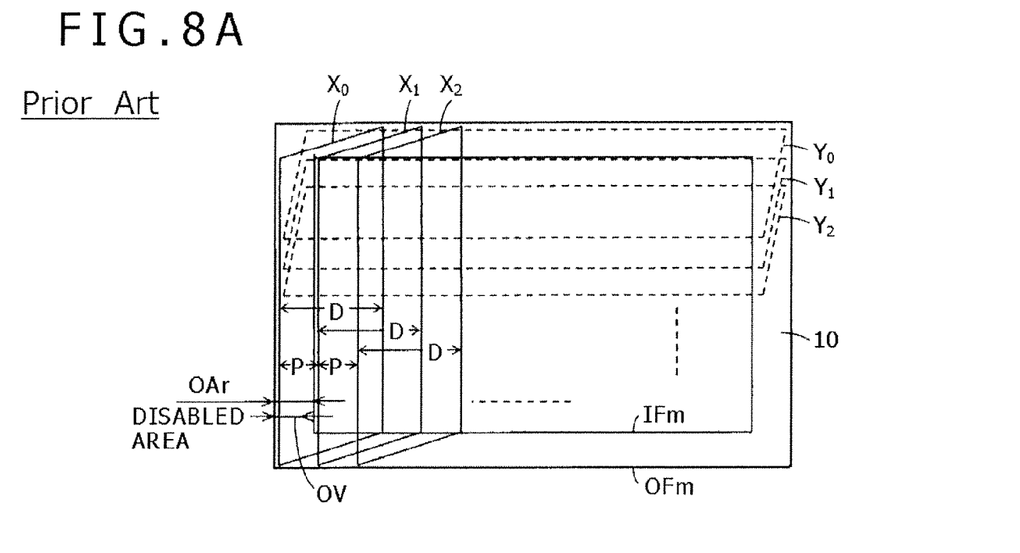
FIGS. 8A to 8C are diagrams for describing an example of a position detection sensor in related art used for an electromagnetic induction indicator position detector.

Focusing on the left edge portion in the X-axis direction in FIG. 8A, a signal is obtained only by the leftmost loop coil $X_0$ in the area outside the second loop coil $X_1$ from the edge portion. Although a weak signal is obtained by the second loop coil $X_1$, the farther away a loop coil is from the loop coil at the center, the more likely it is that a secondary peak of a side lobe may occur. As described earlier, therefore, it is difficult to make an accurate position calculation based on a predetermined relational formula that is dependent on the ratio of the reception signal levels of the loop coils $X_0$ and $X_1$, thus resulting in erroneous detection due to a coordinate jump.

Figure 8B:
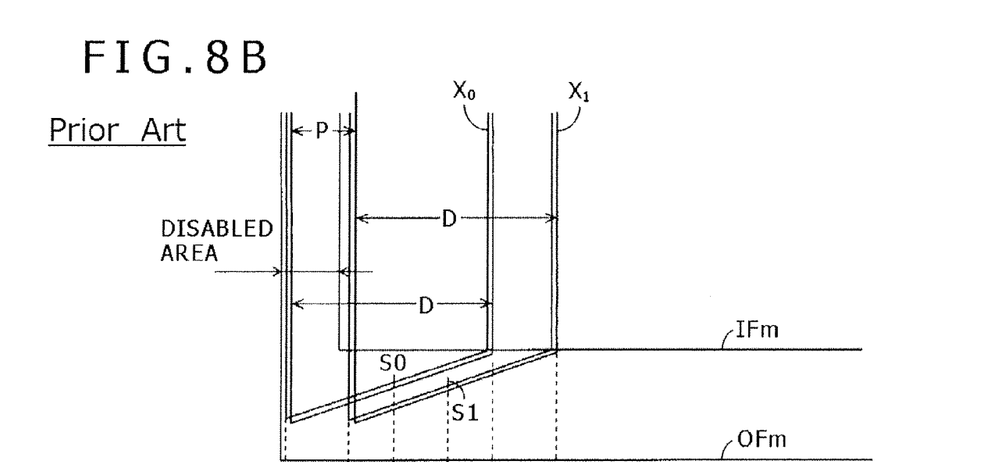
Figure 8C:
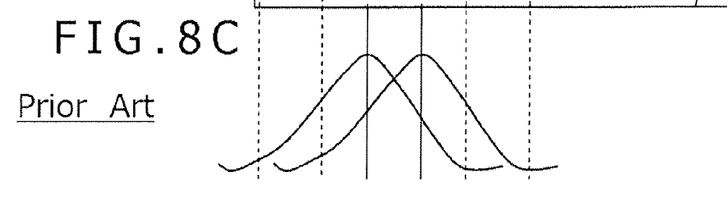

More specifically, FIG. 8B illustrates, in an enlarged fashion, the lower left edge portion of the position detection sensor shown in FIG. 8A. In FIG. 8B, distributions $SX_0$ and $SX_1$ of the signals from the pen-shaped position indicator received by the loop coils $X_0$ and $X_1$ normally peak respectively at midpoints S0 and S1 along the short sides of the loop coils $X_0$ and $X_1$ in accordance with the position indicated by the pen-shaped position indicator as illustrated in FIG. 8C.

As a result, it is possible to identify the position indicated by the pen-shaped position indicator based on the ratio of the signals from the pen-shaped position indicator received by at least two adjacent loop coils and based on the calculation formula which will be described later. Then, the distributions of the signals received by the loop coils $X_0$, $X_1$ and so on (reception signal distributions) are such that the farther away the position indicated by the pen-shaped position indicator is from the midpoints S0 and S1, the more the signal levels decline. However, a so-called side lobe occurs which causes the signal levels to increase rather than decrease if the position indicated by the pen-shaped position indicator is at a given distance or more from the midpoints S0 and S1. Therefore, there may be positions that are completely different but that provide exactly the same signal ratios. In this case, it is probable that, despite the fact that the pen-shaped position indicator is located at a predetermined position, the position detector may detect the position indicated by the pen-shaped position indicator as being located more inward.

In related art, therefore, the area where such erroneous detection is likely to occur (area where it is possible to detect the position indicated by the pen-shaped position indicator only with a single loop coil) has been treated as a disabled area as described earlier. Then, some of the loop coils of the position detection sensor are concentrated in the disabled area for use as an overlapping area. For example, a disabled area OAr is densely packed with the short sides of the loop coils $Y_0, Y_1, Y_2$ and so on arranged in the Y-axis direction in such a manner as to overlap one another. Further, this disabled area is arranged below the bezel holding the liquid crystal, thus keeping the disabled area hidden.

However, there is a recent demand to reduce the product size without changing the size of the display and detection areas of the position input device in response to a rapidly growing use of devices equipped with a position input device such as smartphones. Alternatively, there is a demand to further enlarge the display area without changing the product size. In order to satisfy these demands, it is necessary to downsize the frame (bezel) portion designed to assemble the liquid crystal panel around the display area. However, simply downsizing the frame (bezel) of the liquid crystal panel integral with a position input device results in the disabled area of the position input sensor extending into the display area because the disabled area is provided under the frame. Unduly applying the calculation method using two loop coils (two-point detection method) to this portion may result in erroneous detection of the indicated position.

A possible approach to solve this problem would be to downsize the disabled area by arranging the loop coils more densely, and moreover downsize an overlapping area OV, for example, by reducing the conductor width of each loop coil, for example, from a normal 100 µm to half or 50 µm. Another possible approach would be to use a multilayer substrate to form the detection sensor. However, these approaches will naturally lead to increased cost.

In light of the foregoing, it is desirable to achieve an electromagnetic induction position detection sensor capable of accurately detecting the position indicated in the edge portions despite a smaller disabled area and without entailing any major change that would result in increased cost.

In order to attain the object described above, according to an embodiment of the present invention, there is provided an electromagnetic induction position detection sensor that includes a plurality of loop coils. Each of the loop coils is an N-turn loop coil formed by winding a conductor N times (where N is an integer equal to or greater than 2) and each coil turn has long side portions that are separated by a predetermined width and that are parallel to each other. The loop coils are arranged at predetermined intervals in a predetermined direction intersecting the long side portions of the loop coils. A width of at least one of the N turns of the Mth loop coil from the edge portion of the sensor in the predetermined direction (where M is an integer equal to or greater than 2) is larger than said predetermined width, with the long side portion of said turn of the Mth loop coil arranged more outward than the long side portions of the other turns of the Mth loop coil.

In the electromagnetic induction position detection sensor according to the present invention, each of N-turn loop coils (or each coil turn) is formed in such a manner as to have long side portions that are separated by a predetermined width and that are parallel to each other. The electromagnetic induction position detection sensor is configured in which the plurality of N-turn loop coils are arranged in a predetermined direction intersecting the long side portions of the loop coils and at predetermined intervals. Then, the width of at least one of the N turns of the Mth loop coil from the edge portion of the sensor in the direction of arrangement of the loop coils is made larger than said predetermined width, with the long side portion of this turn of the Mth loop coil arranged more outward than those of the other turns of the Mth loop coil. This provides intended distributions of the reception signals from the pen-shaped position indicator received by the N-turn loop coil.

As a result, it is possible to eliminate erroneous detection caused by the relationship between the N-turn loop coil of interest and its adjacent loop coil even if the two-point detection method is used. This prevents erroneous detection of the position indicated by the pen-shaped position indicator in the edge portions of the position detection sensor, thus providing a smaller disabled area and a larger detection area (area where position detection is possible) of the position detection sensor.

The present invention achieves an electromagnetic induction position detection sensor capable of downsizing the disabled area and upsizing the area where position detection is possible without entailing any major change that would result in increased cost, thus making it possible to deal with so-called slim border intended to reduce the bezel width.

DETAILED DESCRIPTION

A description will be given below of an embodiment of an electromagnetic induction position detection sensor according to the present invention with reference to the accompanying drawings.

Description of the Schematic Configuration of the Position Input Device

Figure 1:
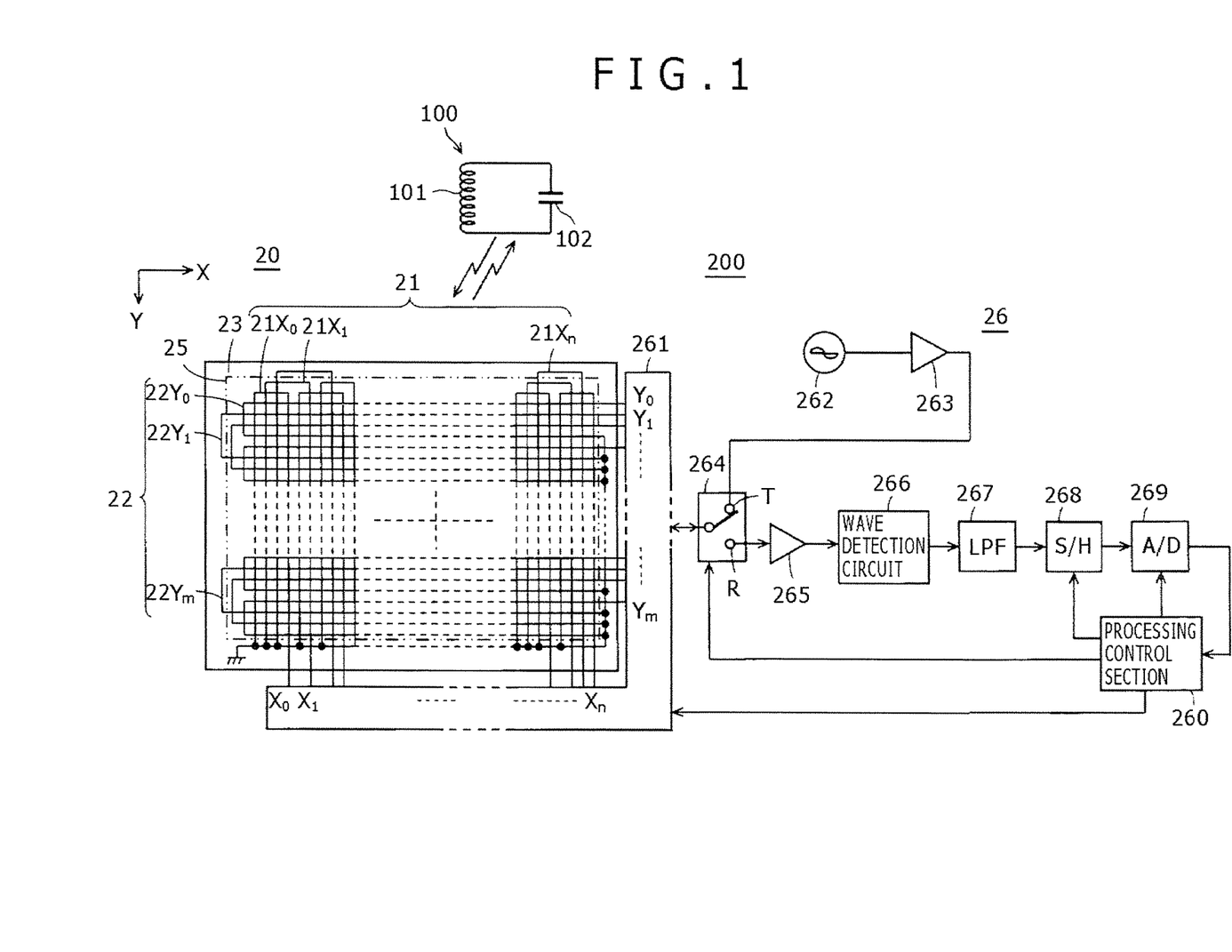
FIG. 1 is a diagram for describing a configuration example of a position input device according to an embodiment.

A description will be given first of the schematic configuration of a position (coordinate) input device (hereinafter simply referred to as the position input device) formed by using the electromagnetic induction position detection sensor according to the present invention. FIG. 1 is a diagram for describing a configuration example of the position input device formed by using the electromagnetic induction position detection sensor according to the present embodiment. As illustrated in FIG. 1, the position input device according to the present embodiment includes a pen-shaped position indicator 100 and indicator position detector 200. The pen-shaped position indicator 100 incorporates a resonance circuit that includes a coil 101 and a capacitor 102 connected in parallel to the coil 101 as illustrated in FIG. 1.

On the other hand, a sensor section (position detection sensor) 20 of the indicator position detector 200 has an X-axis direction loop coil group 21 and Y-axis direction loop coil group 22 arranged on the top and bottom sides of a substrate 23 in such a manner that the two groups 21 and 22 spatially overlap one another. It should be noted that, in the embodiment described below, the horizontal direction of the substrate 23 of the sensor section 20 is the X-axis direction, and the vertical direction thereof the Y-axis direction, as illustrated in FIG. 1.

The X-axis direction loop coil group 21 includes n+1 (where n is an integer equal to or greater than 2) rectangular loop coils $21X_0$ to $21X_n$ arranged in the X-axis direction. On the other hand, the Y-axis direction loop coil group 22 includes m+1 (where m is an integer equal to or greater than 2) loop coils $22Y_0$ to $22Y_m$ arranged in the Y-axis direction. In the sensor section 20, the loop section of the X-axis direction loop coil group 21 and that of the Y-axis direction loop coil group 22 make up a position detection area 25.

The sensor section 20 is connected to a position detection circuit 26 via a connector section which is not shown. The position detection circuit 26 includes a selection circuit 261, oscillator 262, current driver 263, transmit/receive switching circuit 264, reception amplifier 265, wave detection circuit 266, low-pass filter 267, sample hold circuit 268, A/D (Analog to Digital) conversion circuit 269 and processing control section 260. The X- and Y-axis direction loop coil groups 21 and 22 are connected to the selection circuit 261. The selection circuit 261 sequentially selects one of the two loop coil groups 21 and 22 in accordance with a control signal supplied from the processing control section 260.

The oscillator 262 generates an AC (alternating current) signal at a frequency f0. This AC signal is supplied to the current driver 263 for conversion into a current, after which the current signal is transmitted to the transmit/receive switching circuit 264. The transmit/receive switching circuit 264 switches, under control of the processing control section 260, the destination (transmitting terminal T or receiving terminal R) to which the loop coil selected by the selection circuit 261 is connected every predetermined period of time. The current driver 263 is connected to the transmitting terminal T, and the reception amplifier 265 to the receiving terminal R.

During transmission, therefore, the AC signal from the current driver 263 is supplied to the loop coil selected by the selection circuit 261 via the transmitting terminal T of the transmit/receive switching circuit 264. During reception, on the other hand, the induced voltage generated by the loop coil selected by the selection circuit 261 is supplied to the reception amplifier 265 for amplification via the selection circuit 261 and the receiving terminal R of the transmit/receive switching circuit 264, after which the amplified voltage is transmitted to the wave detection circuit 266.

The signal detected by the wave detection circuit 266 is supplied to the A/D conversion circuit 269 via the low-pass filter 267 and sample hold circuit 268. The A/D conversion circuit 269 converts the analog signal into a digital signal, supplying the resultant digital signal to the processing control section 260. The processing control section 260 exercises control for position detection. That is, the processing control section 260 controls the selection of a loop coil by the selection circuit 261, signal switching by the transmit/receive switching circuit 264 and the sampling timing of the sample hold circuit 268.

The processing control section 260 switches the transmit/receive switching circuit 264 over to the transmitting terminal T, thus energizing the loop coil selected by the selection circuit 261 of all the loop coils of the X- and Y-axis direction loop coil groups 21 and 22 and transmitting electromagnetic waves. The resonance circuit of the pen-shaped position indicator 100 receives electromagnetic waves transmitted from the loop coil, thus storing energy.

Next, the processing control section 260 switches the transmit/receive switching circuit 264 over to the receiving terminal R. This causes an induced voltage to be generated by each of the loop coils of the X- and Y-axis direction loop coil group 21 and 22 due to electromagnetic waves transmitted from the pen-shaped position indicator 100. The processing control section 260 calculates the X- and Y-axis coordinates of the indicated position in the position detection area 25 of the sensor section 20 based on the level of the induced voltage generated by each of the loop coils. Then, the processing control section 260 supplies calculated coordinate information, for example, to an external personal computer.

Specific Configuration Example of the Sensor Section 20

A description will be given next of a more specific configuration of the sensor section (position detection sensor) 20 according to the present embodiment to which the present invention is applied. The indicator position detector 200 using the sensor section 20 according to the present embodiment uses the three-point detection method to detect the position indicated by the pen-shaped position indicator 100 based on the signals from three adjacent loop coils in the detection area at a certain distance from the edge portion of the sensor section 20.

Then, the indicator position detector 200 using the sensor section 20 according to the present embodiment uses the two-point detection method to detect the position indicated by the pen-shaped position indicator 100 based on the signals from two adjacent loop coils near the edge portion of the sensor section 20. For this reason, a description will be given first of the outline of the three- and two-point detection methods used to detect the position indicated by the pen-shaped position indicator 100 before describing the specific configuration of the sensor section 20.

A case will be described here in which the position in the X-axis direction indicated on the sensor section 20 by the pen-shaped position indicator 100 is detected. In this case, the indicator position detector 200 makes a so-called global scan to detect the whereabouts of the pen-shaped position indicator 100 on the sensor section 20 by sequentially switching from one loop coil to another for all the loop coils $21X_0$ to $21X_n$ arranged in the X-axis direction.

Then, letting the highest detected signal level of the loop coil be denoted by VP, and the signal levels of the loop coils adjacent thereto on both sides by VL and VR, the x coordinate representing the position in the X-axis direction indicated by the pen-shaped position indicator 100 can be calculated by Equation 1 shown below.

$$X=Px+(DX/2)*(VR-VL)/(2*VP-VR-VL) \quad (1)$$

In Equation 1, Px represents the coordinate of the loop coil from which the peak level was detected, and DX the intervals at which the loop coils are arranged in the X-axis direction. As described above, the three-point detection method allows accurate identification of the position indicated by the pen-shaped position indicator 100 by plugging the highest loop coil signal level and the signal levels of the loop coils adjacent thereto into Equation 1.

In contrast, the two-point detection method calculates the distance from the relational formula that is dependent on the ratio of the signal levels of the two adjacent loop coils. This detection method is used to detect the indicated position near the edge portion of the sensor section 20. Therefore, a description will be given by taking, as an example, a case in which two loop coils, namely, the leftmost loop coil $21X_0$ and the second leftmost and more inward loop coil $21X_1$ in the sensor section 20, are used.

In this case, letting the signal level of the loop coil $21X_0$ be denoted by "a," and that of the loop coil $21X_1$ by "b," a ratio R of two signal levels normalized by the signal levels of the two loop coils of interest can be calculated by Equation 2 shown below.

$$R=(a-b)/(a+b) \qquad (2)$$

Then, the ratio R of two signal levels normalized by Equation 2 becomes larger with the movement of the pen-shaped position indicator 100 toward the edge portion of the sensor with reference to the location where the signal levels of the two loop coils are the same. Correcting this ratio to some extent based on this characteristic makes it possible to identify the position indicated by the pen-shaped position indicator 100 in accordance with the normalized ratio R of two signal levels. The specific configuration of the sensor section 20 which is capable of detecting the position indicated by the pen-shaped position indicator 100 using such three- and two-point detection methods will be described.

It should be noted that although a case has been described here in which the coordinate in the X-axis direction (X-axis coordinate) is identified, the Y-axis coordinate of the indicated position can be similarly identified by means of the three- and two-point detection methods using the loop coils $22Y_0$ to $22Y_m$ arranged in the Y-axis direction.

Figure 2A:
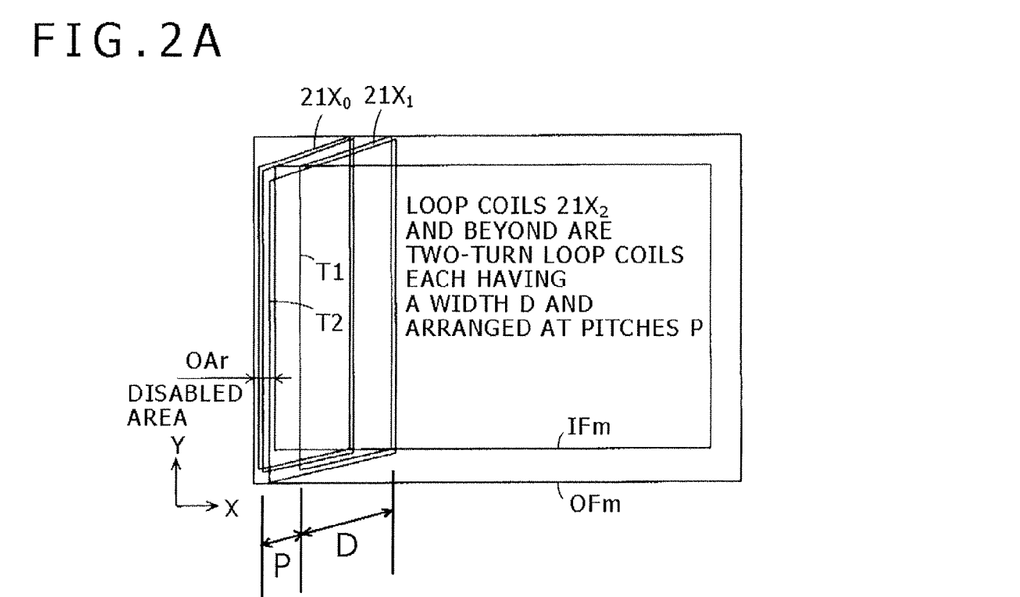
FIGS. 2A to 2C are diagrams for describing the configuration of a sensor section (position detection sensor) according to the embodiment.
Figure 2B:
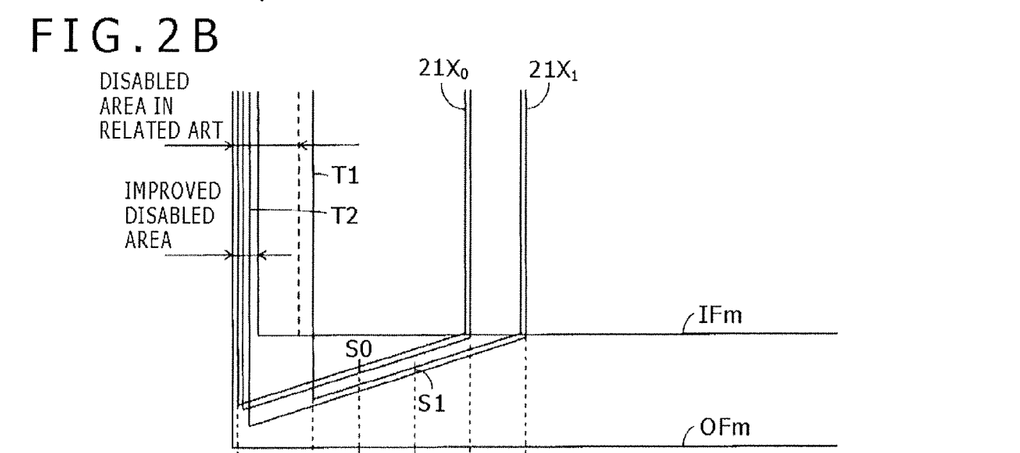
Figure 2C:
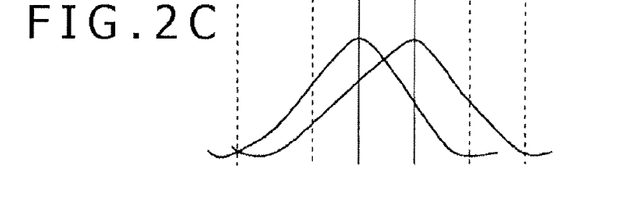

FIGS. 2A to 2C are diagrams for describing the configuration of the sensor section 20 according to the present embodiment. In FIGS. 2A to 2C, FIG. 2A illustrates the overall configuration of the sensor section 20, and FIG. 2B illustrates, in an enlarged manner, the lower left edge portion of the sensor section 20. On the other hand, FIG. 2C illustrates the distributions of the signals received from the pen-shaped position indicator 100 by the loop coils $21X_0$ and $21X_1$ in the X-axis direction located in the left edge portion of the sensor section 20.

As illustrated in FIG. 2A, the X-axis direction loop coil group 21 of the sensor section 20 according to the present embodiment includes the plurality of loop coils $21X_0$, $21X_1$, $21X_2$ and so on, each having two turns of a conductor and the predetermined width D along the short side (horizontal width), arranged at the predetermined pitches P in the X-axis direction. It should be noted that although not shown in FIGS. 2A to 2C for simplification of the description, the Y-axis direction loop coil group 22 also includes the plurality of loop coils $22Y_0$, $22Y_1$, $22Y_2$ and so on, each having two turns of a conductor and the predetermined width along the short side, arranged at the predetermined pitches in the Y-axis direction.

Then, as illustrated in FIG. 2A, the entire area of the sensor section 20 shown by an outer frame OFm is the substrate 23. Further, the area inside an inner frame IFm is the position detection area 25 where the position indicated by the pen-shaped position indicator 100 can be detected. It should be noted that the area sandwiched by the outer frame OFm and inner frame IFm is an area covered, for example, with a bezel (front panel) to serve as the disabled area OAr. Then, we assume, in the present embodiment, that it is necessary to reduce the size of the disabled area on the left edge side in the sensor section 20 as illustrated in FIG. 2A as compared to the size of the disabled area in the sensor section in related art.

In this case, arranging the loop coils, each having the horizontal width D, at the pitches P in the X-axis direction to form the X-axis direction loop coil group alone in the same manner as for the sensor section in related art with reference to FIGS. 8A to 8C may result in erroneous detection of the position indicated by the pen-shaped position indicator 100 in the left edge portion of the sensor section 20. The erroneous detection in this case is caused by the fact that even if the pen-shaped position indicator 100 is on the bezel, the coordinates of the pen tip found by the two-point detection method used for detection near the edge portion of the sensor section 20 as described above are more inward than the actual pen tip position of the pen-shaped position indicator 100.

In the sensor section 20 according to the present embodiment, for this reason, we have introduced a new and previously unseen approach to the arrangement of the loop coil $21X_1$, which is the second loop coil from the left edge. First, in the sensor section 20 according to the present embodiment, the left long side portions of the loop coil $21X_0$ to be arranged at the leftmost edge side are placed on the left edge side in the disabled area OAr, and the right long side portions thereof are placed inside the position detection area 25 within the inner frame IFm as illustrated in FIG. 2A. This arrangement of the loop coil $21X_0$ is the same as for the sensor section in related art.

Then, as for the loop coil $21X_1$ adjacent on the right to the loop coil $21X_0$, one of the two coils (T2) of the left long side portions thereof is placed on the left edge side in the disabled area OAr, i.e., near the left long side portions of the loop coil $21X_0$, in such a manner as to straddle the disabled area OAr in related art. It should be noted that this disabled area OAr is also an overlapping area densely packed with the short side portions of the loop coils of the Y-axis direction loop coil group 22 that overlap one another. Further, the other of the two coils (T1) of the left long side portions of the loop coil $21X_1$ is placed inside the position detection area 25 within the inner frame IFm or on the right side in the overlapping area depending on the size of the horizontal width D of the loop coil. Still further, the right long side portions of the two coils of the loop coil $21X_1$ are placed inside the position detection area 25 within the inner frame IFm.

As described above, the left long side portions of the different turns of the two-turn loop coil $21X_1$ are arranged at different positions. This ensures that the distribution of the signal received by the loop coil $21X_1$ from the pen-shaped position indicator 100 (reception signal distribution) is a desired one (such that a signal level skirt increases slightly toward the edge portion). As a result, it is possible to prevent a plurality of locations from having the same normalized ratio R of two signal levels in terms of the reception signal distributions of the loop coil $21X_1$ and its nearby loop coil.

More specifically, the left long side portions of the loop coil $21X_0$ are located on the left edge side in the disabled area OAr, and the right long side portions thereof are located inside the position detection area 25 within the inner frame IFm as illustrated in an enlarged manner in FIG. 2B. In contrast, the left long side portion of a first turn coil T1 of the loop coil $21X_1$ is located at the same position as for the loop coil $X_1$ of the sensor section in related art described with reference to FIGS. 8A to 8C. However, the left long side portion of a second turn loop coil T2 of the loop coil $21X_1$ is located near the left long side portions of the loop coil $21X_0$ adjacent on the left to the loop coil $21X_1$. Further, the right long side portions of the first and second turn coils T1 and T2 of the loop coil $21X_1$ are both located approximately at the same position within the inner frame IFm (inside the position detection area 25).

It should be noted that, in the present specification, the initial turn of the loop coil $21X_1$ and so on formed by winding a conductor counterclockwise is counted as the first turn, and the next turn formed in the same manner is counted as the second turn.

Then, the reception signal distribution of the loop coil $21X_0$ is approximately linearly symmetrical with respect to the midpoint S0 along the short side of the loop coil $21X_0$ as illustrated in FIG. 2C. In contrast, in the case of the sensor section 20 according to the present embodiment, the reception signal distribution of the loop coil $21X_1$ is no longer linearly symmetrical and spreads more to the left edge side of the sensor section 20 as a result of the positioning of the left long side portion of the second turn loop coil T2 on the left edge side in the disabled area OAr.

This eliminates the likelihood of a plurality of locations having the same normalized ratio R of two signal levels for the loop coils $21X_0$ and $21X_1$ in the reception signal distribution. Therefore, it is possible to expand the position detection area 25 on the left edge of the sensor section 20 without causing any erroneous detection of the position indicated by the pen-shaped position indicator 100.

It should be noted that although a case has been described here in which the present invention is applied to the loop coils belonging to the X-axis direction loop coil group arranged on the left edge side in the sensor section 20 for simplification of the description, the present invention is not limited thereto. Instead, the present invention is applicable not only to the right edge side in the X-axis direction in the sensor section 20 but also to both edge sides in the Y-axis direction, thus providing the same effect in these cases.

Figure 3:
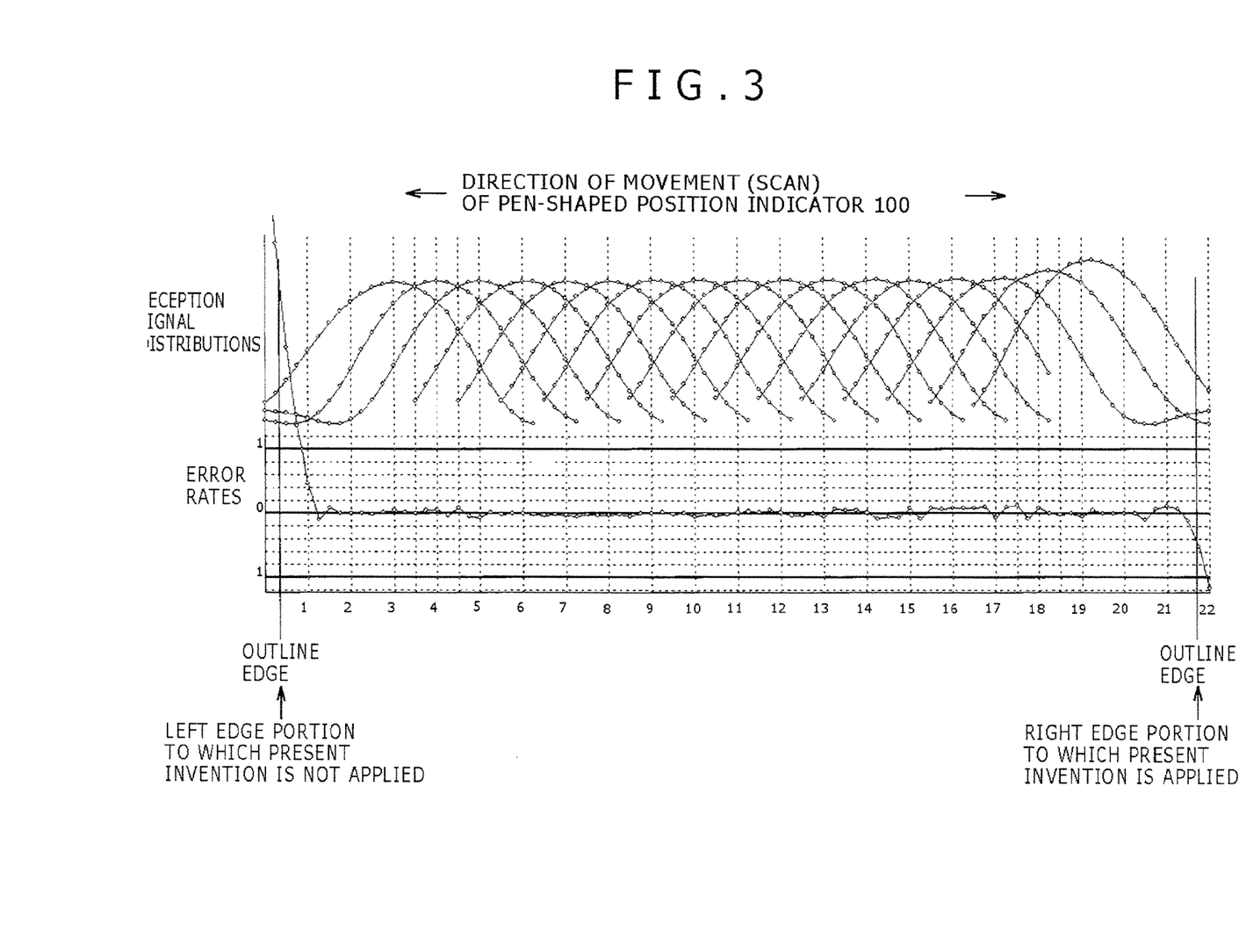
FIG. 3 is a diagram for describing the effect of the invention confirmed by experiment.

FIG. 3 is a diagram for describing the effect of the present invention confirmed by experiment. FIG. 3 shows the measured reception signal distributions and error rates of the loop coils of the X-axis direction loop coil group 21 when the pen-shaped position indicator 100 moves on the sensor section 20 in the X-axis direction, with the sensor section 20 formed by applying the present invention only to the right edge side thereof. The outline edge of the sensor section 20 is located at the same distance from the left and right edges.

It should be noted that the error rates indicate the magnitude of deviation between the actual position indicated by the pen-shaped position indicator 100 and the indicated position detected via the sensor section 20. Then, although the error rate on the right edge portion is negative, this negative error rate is only related to the movement direction of the pen-shaped position indicator 100, and this does not mean that there are fewer errors. The error rate is expressed as an absolute value starting from 0 (zero) for evaluation.

Then, as is clear from the error rates shown in FIG. 3, although the error rates near the outline edge of the left edge portion to which the present invention is not applied increase steeply, the error rates near the outline edge of the right edge side to which the present invention is applied are significantly smaller than in the left edge portion. Then, the two-point detection method is used for detection near the edge portion of the sensor section 20 as described earlier. A case will be further investigated in which the position indicated by the pen-shaped position indicator 100 is detected using this two-point detection method.

Figure 4:
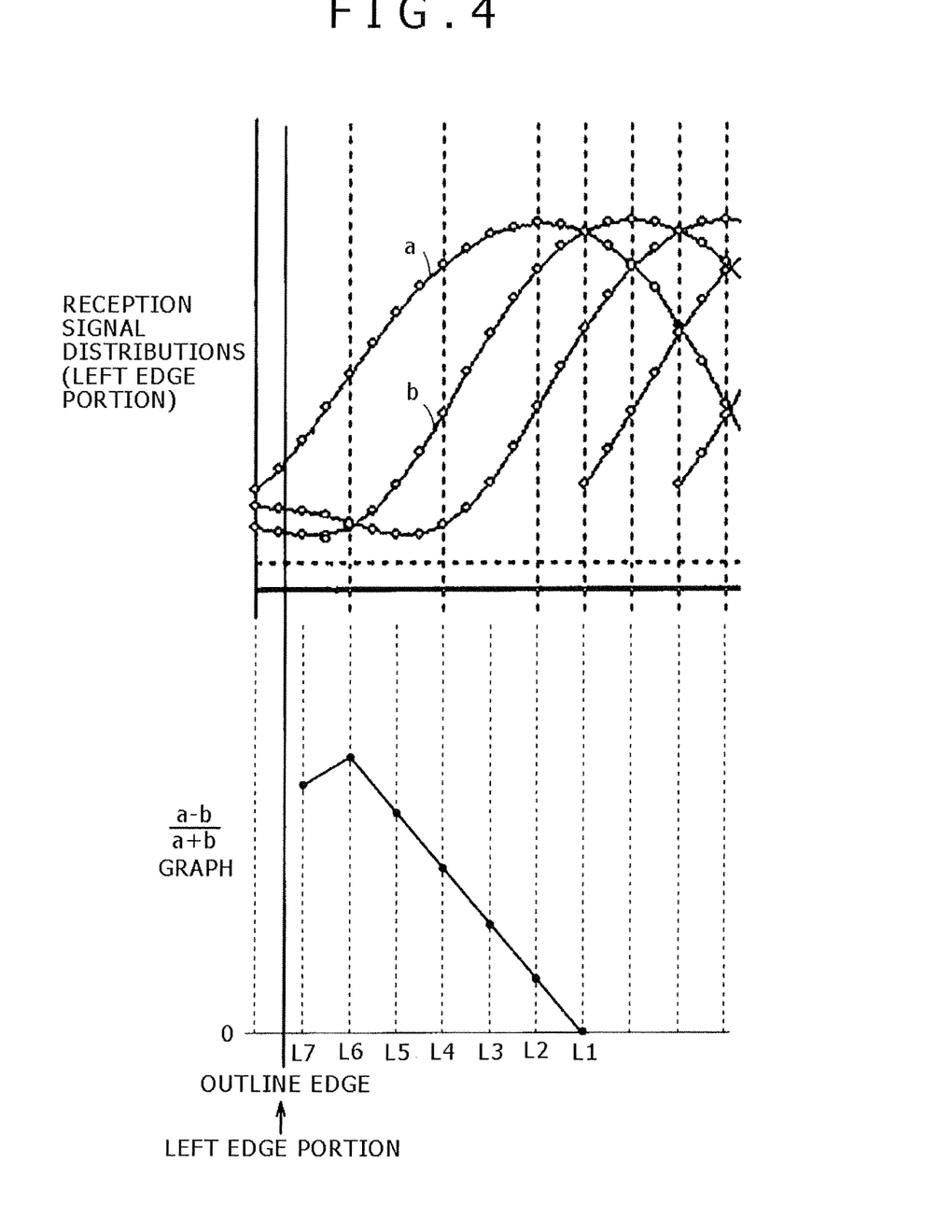
FIG. 4 is a diagram illustrating the characteristic of the left edge portion of the sensor section to which the present invention is not applied.

FIG. 4 is a diagram illustrating the characteristic of the left edge portion side of the sensor section 20 to which the present invention is not applied. The reception signal distribution graph at the top is related to the loop coil reception signal distribution graph for the left edge portion side shown in FIG. 3. On the other hand, the graph at the bottom in FIG. 4 illustrates the ratio R of two signal levels normalized by the signal levels "a" and "b" found by the two-point detection method when the signal level "a" represents the reception signal level of the leftmost loop coil $21X_0$ and the signal level "b" represents the reception signal level of the loop coil $21X_1$ adjacent on the right to the loop coil $21X_0$. The position indicated by the pen-shaped position indicator 100 near the left edge portion is identified in accordance with the normalized ratio R of two signal levels found by the two-point detection method.

Figure 5:
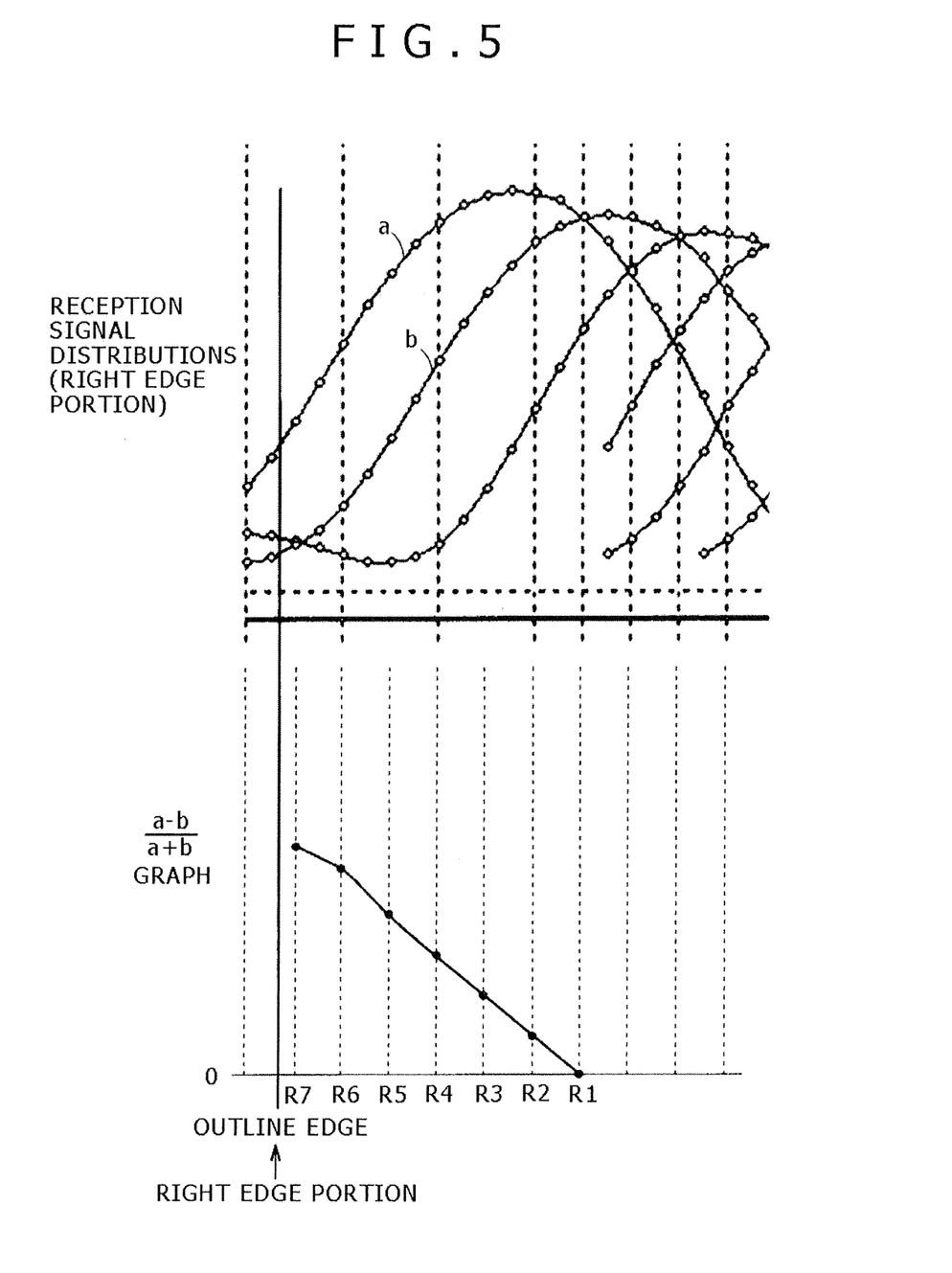
FIG. 5 is a diagram illustrating the characteristic of the right edge portion of the sensor section to which the present invention is applied, by reversing right and left.

On the other hand, FIG. 5 illustrates the characteristic of the right edge portion side of the sensor section 20 to which the present invention is applied, with right and left reversed for easy comparison with FIG. 4. The reception signal distribution graph at the top is related to the loop coil reception signal distribution graph for the right edge portion side shown in FIG. 3. On the other hand, the graph at the bottom in FIG. 5 illustrates the ratio R of two signal levels normalized by the signal levels "a" and "b" found by the two-point detection method when the signal level "a" represents the reception signal level of the rightmost loop coil $21X_n$ and the signal level "b" represents the reception signal level of the loop coil $21X_{n-1}$ adjacent on the left to the loop coil $21X_n$. The position indicated by the pen-shaped position indicator 100 near the right edge portion is identified in accordance with the normalized ratio R of two signal levels found by the two-point detection method.

Then, as is clear from the ration graph shown at the bottom in FIG. 4, the normalized ratio R of the reception signal level "a" of the loop coil $21X_0$ and the reception signal level "b" of the loop coil $21X_1$ is 0 at a position L1 because the two signal levels are the same at this position. Then, when the position indicated by the pen-shaped position indicator 100 moves toward the left edge side from the position L1 to L2, to L3, to L4, to L5, to L6 and so on, the normalized ratio R of the reception signal level "a" of the loop coil $21X_0$ and the reception signal level "b" of the loop coil $21X_1$ increases gradually.

At a position L7 near the outline edge on the left edge side, however, the normalized ratio R of the reception signal level "a" of the loop coil $21X_0$ and the reception signal level "b" of the loop coil $21X_1$ declines as compared to that at the immediately previous position L6. In this case, the indicator position detector 200 erroneously detects that the position indicated by the pen-shaped position indicator 100 is located to the right of the position L6 despite the fact that the position indicated by the pen-shaped position indicator 100 is located at the position L7 on the sensor section 20.

In contrast, as is clear from the ratio graph shown at the bottom in FIG. 5, the ratio of the signal levels related to the indicated position does not decline in the right edge portion of the sensor section 20 to which the present invention is applied. That is, the normalized ratio R of the reception signal level "a" of the loop coil $21X_n$ and the reception signal level "b" of the loop coil $21X_{n-1}$ is 0 at a position R1 because the two signal levels are the same at this position as illustrated by the graph at the bottom of FIG. 5.

Then, when the position indicated by the pen-shaped position indicator 100 moves toward the left edge side from the position R1 to R2, to R3, to R4, to R5, to R6 and R7, the normalized ratio R of the reception signal level "a" of the loop coil $21X_n$ and the reception signal level "b" of the loop coil $21X_{n-1}$ increases gradually. Then, at the position R7 near the outline edge on the right edge side, the normalized ratio R of the reception signal level "a" of the loop coil $21X_n$ and the reception signal level "b" of the loop coil $21X_{n-1}$ is greater than that at the immediately previous position R6.

On the right edge side of the sensor section 20 to which the present invention is applied, therefore, the normalized ratio R of the reception signal level "a" of the loop coil $21X_n$ and the reception signal level "b" of the loop coil $21X_{n-1}$ changes linearly without any decline. That is, the right edge side of the sensor section 20 to which the present invention is applied ensures freedom from erroneous detection of the position indicated by the pen-shaped position indicator 100.

As described above, the present invention offers a significantly advantageous effect in that erroneous detection of the position indicated by the pen-shaped position indicator 100 is eliminated near the edge portion of the sensor section 20 even when the two-point detection method is used. This provides an electromagnetic induction position detection sensor capable of accurately detecting the position indicated by a pen-shaped position indicator in the edge portions of the sensor section despite a smaller disabled area and without entailing any major change that would result in increased cost.

Variations of Arrangement of the Loop Coils

In the above embodiment, a case has been described in which two-turn loop coils are used in the sensor section 20, with one of the turns of the second loop coil from the edge portion of the sensor section 20 placed on the edge portion side, as described with reference to FIGS. 2A to 2C. However, the arrangement of the loop coils is not limited thereto. Variations of arrangement of loop coils making up the sensor section 20 are possible.

Figure 6A:
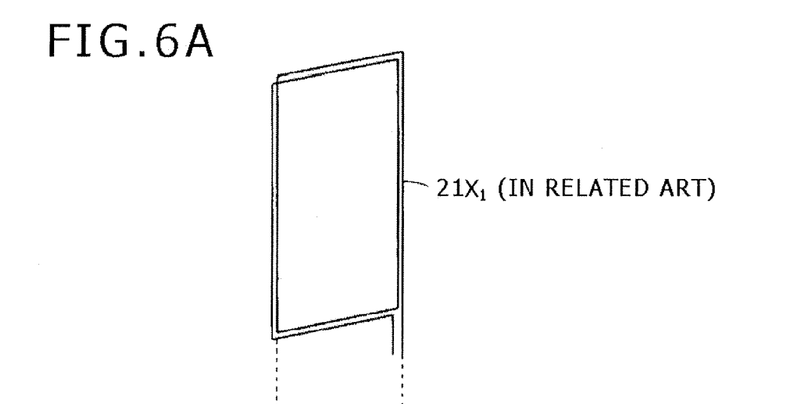
FIGS. 6A to 6D are diagrams for describing variations of arrangement positions of the different turns of a two-turn loop coil.
Figure 6B:
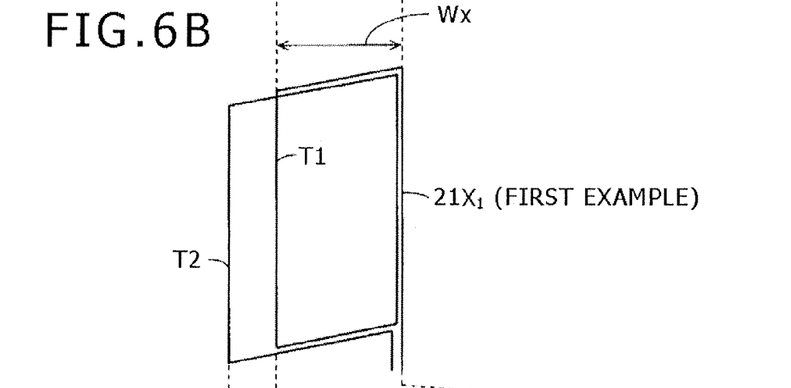

FIGS. 6A to 6D are diagrams for describing variations of arrangement positions of the different turns of a two-turn loop coil. FIG. 6A illustrates a two-turn loop coil in related art. In contrast, in the case of the present invention described with reference to FIGS. 2A to 2C, the left long side portion of the first turn coil T1 of the loop coil $21X_1$ is placed where an original horizontal width Wx is maintained as illustrated in FIG. 6B. Then, the left long side portion of the second turn coil T2 is placed more to the left edge side. This ensures that the distribution of the signal received by the loop coil $21X_1$ is as intended, thus preventing a plurality of locations from having the same ratio of reception signal levels because of the relationship in reception signal distribution between the loop coils adjacent to each other. Therefore, it is possible to prevent erroneous detection of the position indicated by the pen-shaped position indicator 100.

Figures 6C, 6D:
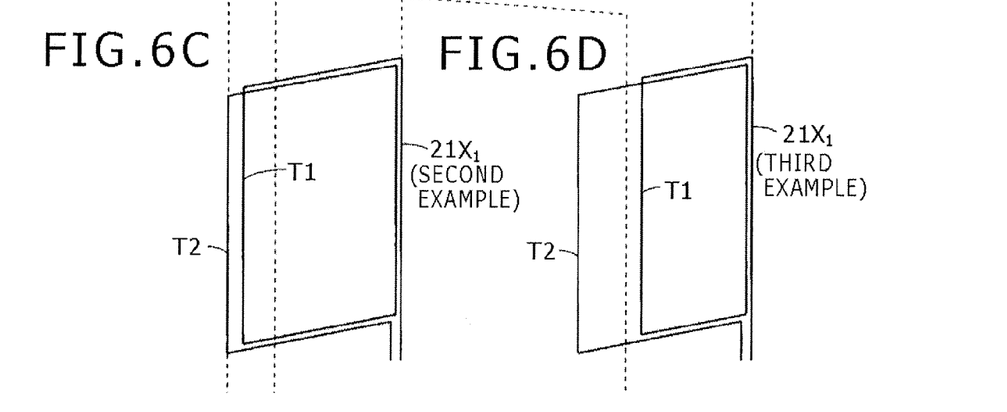

Alternatively, the left long side portion of the first turn coil T1 of the loop coil $21X_1$ is placed to the left edge side of the position shown by a dotted line where the original horizontal width Wx is maintained as illustrated in FIG. 6C. Then, the left long side portion of the second turn coil T2 may be placed more to the left edge side than the left long side portion of the first turn coil T1. Still alternatively, the left long side portion of the first turn coil T1 of the loop coil $21X_1$ is placed to the right side of the position shown by the dotted line where the original horizontal width Wx is maintained as illustrated in FIG. 6D. Then, the left long side portion of the second turn coil T2 may be placed on the left edge side.

As described above, it is possible to adjust the arrangement positions of the left long side portions of the coils as appropriate so as to achieve the intended distribution of the signal received by the loop coil $21X_1$. Further, although a description has been given of the arrangement of the left long side portion of the second turn coil T2 more to the left than the left long side portion of the first turn coil T1 with reference to FIGS. 2A to 2C and FIGS. 6A to 6D, the arrangement of the loop coils is not limited thereto. Conversely, the left long side portion of the first turn coil T1 may be naturally placed more to the left than the left long side portion of the second turn coil T2.

It should be noted that a description has been given by taking, as an example, the loop coil $21X_1$ located on the left edge side in the sensor section 20. In the case of a loop coil located on the right edge side in the sensor section 20, however, the arrangement positions of the right long side portions of the second loop coil from the right edge side, for example, are adjusted.

On the other hand, the loop coils are not limited to two-turn coils. Loop coils having three or more turns may also be used. When loop coils having three or more turns are used, the left long side portions of the different turns can be similarly arranged at different positions, or two or more long side portions can be arranged at the same position, although the left long side portions of all the turns are not arranged at the same position.

As described above, even if the loop coil $21X_1$ having three turns is used, it is possible to adjust the arrangement positions of the left long side portions of the coils as appropriate so as to achieve the intended reception signal distribution. Further, it is possible to specify, as desired, which turn is to be located where, in the same manner as for the two-turn loop coils described with reference to FIGS. 6A to 6D. It should be noted that, for the loop coils located on the right edge side in the sensor section 20, the arrangement positions of the right long side portions of the second loop coil from the right edge side are adjusted.

As described above, it is possible to use loop coils having an appropriate number of turns equal to or greater than two for the loop coils making up the X-axis direction loop coil group 21 and Y-axis direction loop coil group 22.

Figure 7A:
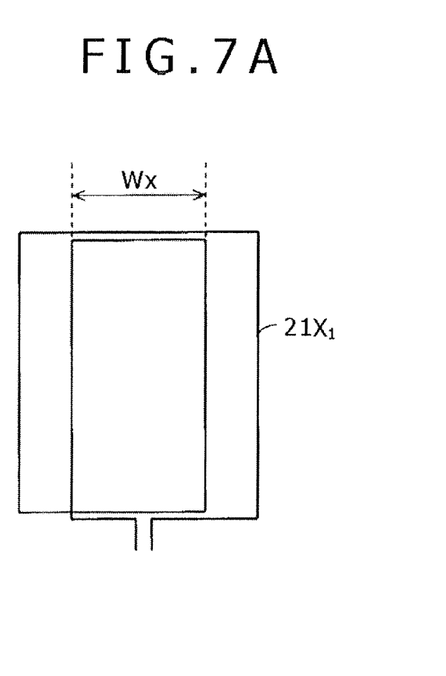
FIGS. 7A to 7C are diagrams for describing variations of arrangement positions of the different turns of a two-turn loop coil.
Figure 7B:
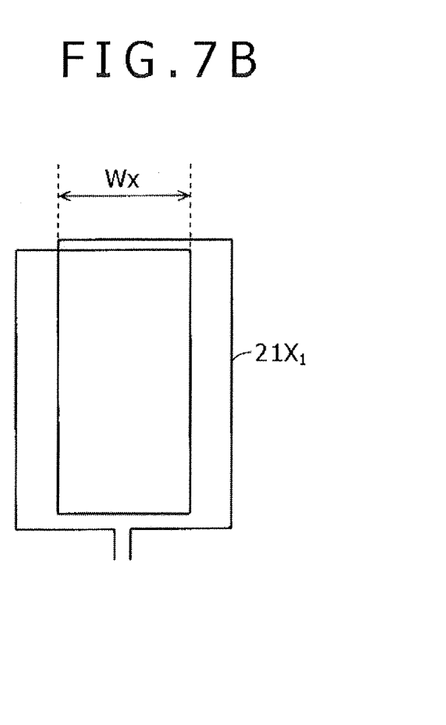
Figure 7C:
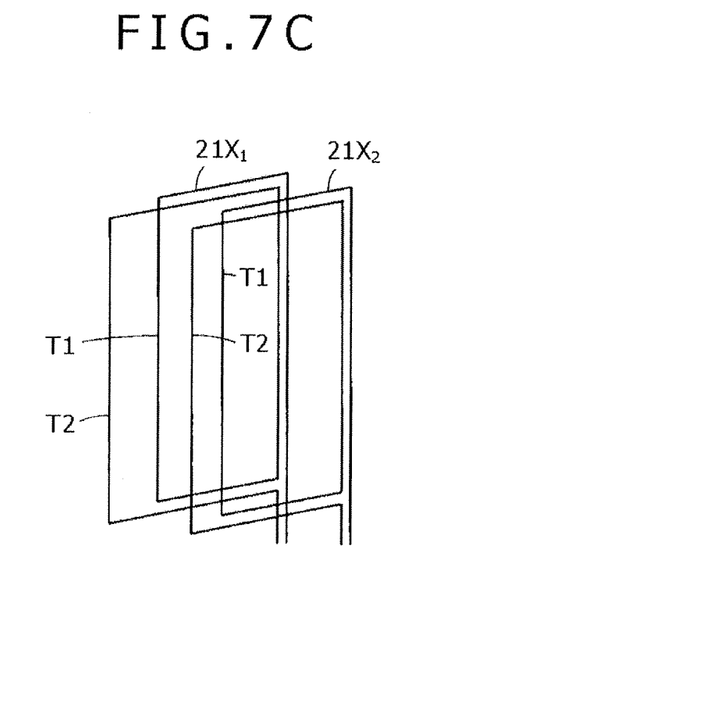

FIGS. 7A to 7C are diagrams for describing other examples of variations of arrangement positions of the different turns of a two-turn loop coil. In the case of the example shown in FIGS. 6A to 6D, the positions of only the left long side portions of the loop coil $21X_1$ are adjusted. In order to achieve a desired reception signal distribution, however, the right long side portions may be also arranged at positions different from normal ones as illustrated, for example, in FIGS. 7A and 7B.

That is, in the case of the loop coil $21X_1$ shown in FIG. 7A, a case is shown in which the right long side portion of the first turn is placed more to the right edge side, and the left long side portion of the first turn is placed more to the left edge side. It should be noted that, in FIG. 7A, the right and left long side portions of the second turn are placed where the original horizontal width Wx is maintained. Naturally, conversely to FIG. 7A, the right and left long side portions of the first turn may be placed where the original horizontal width Wx is maintained, with the right long side portion of the second turn placed more to the right edge side, and the left long side portion of the second turn placed more to the left edge side.

In the case of the loop coil $21X_1$ shown in FIG. 7B, on the other hand, the right long side portion of the first turn is placed more to the right edge side, and the left long side portion of the first turn is placed where the original horizontal width Wx is maintained. Further, in the case of the loop coil $21X_1$ shown in FIG. 7B, the right long side portion of the second turn is placed where the original horizontal width Wx is maintained, and the left long side portion of the second turn is placed more to the left edge side. Naturally, conversely to FIG. 7B, the right long side portion of the first turn may be placed where the original horizontal width Wx is maintained, and the left long side portion of the first turn may be placed more to the left edge side, with the right long side portion of the second turn placed more to the right edge side, and the left long side portion of the second turn placed where the original horizontal width Wx is maintained.

It should be noted that although, in FIGS. 7A and 7B, cases are shown in which the target left and right long side portions are moved approximately to the same extent, these left and right long side portions may be naturally moved to different extents from each other. That is, the target left and right long side portions may be arranged at appropriate positions.

Alternatively, as illustrated in FIG. 7C, the left long side portions of the first turn coils T1 or second turn coils T2 of both of the loop coil $21X_1$ and its adjacent loop coil $21X_2$ may be placed more to the left edge side as necessary. This provides a desired relationship in signal distribution between the loop coils $21X_1$ and $21X_2$. It should be noted that FIG. 7C illustrates a case in which the left long side portion of the second turn coil T2 is placed more to the left edge side.

Naturally, in the case of the right edge side in the sensor section 20, the right long side portions of the second and third loop coils from the right edge are placed more to the right edge side. Further, in such two adjacent loop coils, it is possible to place, on the left and right edge sides, the long side portion of a turn making up a loop coil closer to the edge as illustrated in FIGS. 7A and 7B.

It should be noted that although a description has been given by taking, as an example, a case in which two-turn loop coils are used in FIGS. 7A to 7C, the present invention is not limited thereto. The present invention can similarly deal with the use of loop coils having three or more turns. If the loop coils having three or more turns are used, the only difference lies in that the long side portions of different turns are placed more to the left edge side or right edge side.

Effects Provided by the Sensor Section (Position Detection Sensor) 20 According to the Embodiment If, for example, loop coils, each having a conductor of 100 μm in width, are arranged to form a position detection sensor in related art, the disabled area is approximately 4.5 mm in size. However, if the sensor section (position detection sensor) 20 according to the present invention is used which is designed to change the reception signal distributions by adjusting the arrangement positions of the different turns as described above, it is possible to reduce the disabled area of the position detection sensor closer to zero. That is, it is possible to provide improved performance of the position detection sensor.

Further, if, for example, loop coils, each having a conductor of 50 μm in width, are arranged to form a position detection sensor in related art, the disabled area can be reduced to approximately 2.5 mm in size. However, this not only is disadvantageous in terms of cost and yield, but also leads to higher impedance of the loop coils, thus making it difficult to upsize the position detection sensor. However, the present invention ensures freedom from higher cost and lower yield. Further, the present invention eliminates the need to reduce the pattern width of the loop coils, thus preventing increase in loop coil impedance and meeting the demand for upsizing the position detection sensor.

Further, another possible approach to reducing the disabled area would be to use a multilayer position detection sensor. However, using a multilayer position detection sensor leads to an increased thickness. This will therefore not only affect the incorporation of the position detection sensor into products, but also lead to higher cost. However, the present invention maintains the thickness and cost of the position detection sensor unchanged. As a result, it is possible to achieve a position detection sensor that is particularly suitable for equipment such as a tablet terminal or smartphone that incorporates a position detection sensor in its enclosure.

Modification Examples

Although a description has been given, in the embodiment described above, of a case in which the present invention is applied to the second loop coil $21X_1$ from the left edge in the sensor section 20, the present invention is not limited thereto. Instead, the present invention is applicable to the third, fourth or other loop coil at an appropriate position from one of the edges of the sensor section to which the present invention is applied. It is only necessary to determine to which loop coil the present invention is to be applied based on tradeoffs with the reception signal distributions of the loop coils.

Further, a description has been given assuming that loop coils having a given number of turns such as two turns make up the X-axis direction loop coil group 21 and Y-axis direction loop coil group 22 of the sensor section 20 according to the present embodiment. However, the present invention is not limited thereto. Instead, it is only necessary to use a loop coil having a plurality of turns at least for the target loop coil whose reception signal distribution is to be modified. However, it is preferred that all the loop coils should have the same number of turns in order to simplify the detection of the position indicated by the pen-shaped position indicator as much as possible.

Still further, the present invention is applicable not only to the left edge side of the sensor section 20 but also to both edges in the X-axis direction of the sensor section 20 and one or both of the two edges in the Y-axis direction. Therefore, it is only necessary to apply the present invention to the edges where the disabled area OAr becomes smaller in the sensor section 20 in relation to factors such as the bezel.

The invention claimed is:

1. A position detection sensor comprising:
a detection area and a disabled area on a substrate, the disabled area placed peripheral to the detection area to define an edge of the position detection sensor; and
T number of coils (T is 3 or more) wherein each coil includes multiple turns formed by winding a conductor, wherein each turn of each coil has two elongate sections wherein a first elongate section is positioned closer to the edge than a second elongate section, wherein the coils are arranged at a predefined pitch (P) along a defined direction from the edge that intersects the first elongate section and the second elongate section, and wherein the coils include a 1st coil closest to the edge, one or more Mth coil(s) adjacent to the 1st coil where M =2, . . . , T−1 and M identifies the position of a coil from the 1st coil, and a Tth coil farthest from the edge; wherein
the first elongate section of each turn of the 1st coil is located in the disabled area,
the second elongate section of each turn of the 1st coil is located in the detection area,
at least one Mth coil includes at least one turn having a width W1 between the first and second elongate sections and at least one turn having a width W2 between the first and second elongate sections, where W1>W2,
the second elongate sections of the turns having the width W1 and W2 are aligned and located in the detection area, and
the first elongate section of the at least one turn having the width W1 is located in the disabled area and located in between the edge and the first elongate section of the at least one turn having the width W2.

2. The position detection sensor of claim 1, wherein the first elongate section of the at least one turn having the width W2 is located in the detection area.

3. The position detection sensor of claim 1, wherein the first elongate section of the at least one turn having the width W2 is located in the disabled area.

4. The position detection sensor of claim 1, wherein the at least one Mth coil including the turns having the width W1 and W2 is a 2nd coil immediately adjacent to the 1st coil.

5. The position detection sensor of claim 1, wherein the coils are rectangular coils and the two elongate sections of each turn are parallel to each other and longer than two other sections of each turn that extend in the defined direction.

6. The position detection sensor of claim 1, wherein the disabled area of the sensor has reduced sensitivity relative to the detection area of the sensor.

7. The position detection sensor of claim 1, wherein the coils are arranged to partially overlap with each other in the defined direction.

8. A position detection apparatus comprising:
a housing including a bezel;
a display held in the housing by the bezel; and
a position detection sensor held in the housing, the position detection sensor including:
a detection area and a disabled area on a substrate, the disabled area placed peripheral to the detection area to define an edge of the position detection sensor;
circuitry which, in operation, receives position signals from an indicator placed on or adjacent to the detection area and the disabled area, and detects a position indicated by the indicator based on the received position signals; and
T number of coils (T is 3 or more) wherein each coil includes multiple turns formed by winding a conductor, wherein each turn of each coil has two elongate sections wherein a first elongate section is positioned closer to the edge than a second elongate section, wherein the coils are arranged at a predefined pitch (P) along a defined direction from the edge that intersects the first elongate section and the second elongate section, and wherein the coils include a 1st coil closest to the edge, one or more Mth coil(s) adjacent to the 1st coil where M =2, . . . , T−1 and M identifies the position of a coil from the 1st coil, and a Tth coil farthest from the edge; wherein
the first elongate section of each turn of the 1st coil is located in the disabled area,
the second elongate section of each turn of the 1st coil is located in the detection area
at least one Mth coil includes at least one turn having a width W1 between the first and second elongate sections and at least one turn having a width W2 between the first and second elongate sections, where W1>W2,
the second elongate sections of the turns having the width W1 and W2 are aligned and located in the detection area, and
the first elongate section of the at least one turn having the width W1 is located in the disabled area and located in between the edge and the first elongate section of the at least one turn having the width W2.

9. The position detection apparatus of claim 8, wherein the first elongate section of the at least one turn having the width W2 is located in the central detection area.

10. The position detection apparatus of claim 8, wherein the first elongate section of the at least one turn having the width W2 is located in the disabled area.

11. The position detection apparatus of claim 8, wherein the at least one Mth coil including the turns having the width W1 and W2 is a 2nd coil immediately adjacent to the 1st coil.

12. The position detection apparatus of claim 8, wherein the coils are rectangular coils and the two elongate sections of each turn are parallel to each other and longer than two other sections of each turn that extend in the defined direction.

13. The position detection apparatus of claim 8, wherein the disabled area of the sensor has reduced sensitivity relative to the detection area of the sensor.

14. The position detection apparatus of claim 8, wherein the coils are arranged to partially overlap with each other in the defined direction.

15. The position detection apparatus of claim 8, wherein the display is a liquid crystal display.

16. The position detection apparatus of claim 8, wherein the disabled area of the sensor is placed underneath the bezel of the housing holding the display.

17. A tablet device comprising:
a housing;
a display held in the housing; and
a position detection sensor held in the housing, the position detection sensor including:
a detection area and a disabled area on a substrate, the disabled area placed peripheral to the detection area to define an edge of the position detection sensor;
circuitry which, in operation, receives position signals from an indicator placed on or adjacent to the detection area and the disabled area, and detects a position indicated by the indicator based on the received position signals; and
T number of coils (T is 3 or more) wherein each coil includes multiple turns formed by winding a conductor, wherein each turn of each coil has two elongate sections wherein a first elongate section is positioned closer to the edge than a second elongate section, wherein the coils are arranged at a predefined pitch (P) along a defined direction from the edge that intersects the first elongate section and the second elongate section, and wherein the coils include a 1st coil closest to the edge, one or more Mth coil(s) adjacent to the 1st coil where M =2, . . . , T−1 and M identifies the position of a coil from the 1st coil, and a Tth coil farthest from the edge; wherein
the first elongate section of each turn of the 1st coil is located in the disabled area,
the second elongate section of each turn of the 1st coil is located in the detection area
at least one Mth coil includes at least one turn having a width W1 between the first and second elongate sections and at least one turn having a width W2 between the first and second elongate sections, where W1>W2,
the second elongate sections of the turns having the width W1 and W2 are aligned and located in the detection area, and
the first elongate section of the at least one turn having the width W1 is located in the disabled area and located in between the edge and the first elongate section of the at least one turn having the width W2.

18. A method of detecting a position indicated by an indicator, comprising:
providing a position detection sensor including a detection area and a disabled area, the disabled area placed peripheral to the detection area to define an edge of the position detection sensor;
receiving position signals from an indicator placed on or adjacent to the detection area and the disabled area; and detecting a position indicated by the indicator in the detection area and the disabled area based on the received position signals; wherein the position detection sensor includes:

T number of coils (T is 3 or more) wherein each coil includes multiple turns formed by winding a conductor, wherein each turn of each coil has two elongate sections wherein a first elongate section is positioned closer to the edge than a second elongate section, wherein the coils are arranged at a predefined pitch (P) along a defined direction from the edge that intersects the first elongate section and the second elongate section, and wherein the coils include a 1st coil closest to the edge, one or more Mth coil(s) adjacent to the 1st coil where M =2, . . ., T−1 and M identifies the position of a coil from the 1st coil, and a Tth coil farthest from the edge; wherein the first elongate section of each turn of the 1st coil is located in the disabled area, the second elongate section of each turn of the 1st coil is located in the detection area, at least one Mth coil includes at least one turn having a width W1 between the first and second elongate sections and at least one turn having a width W2 between the first and second elongate sections, where W1>W2, the second elongate sections of the turns having the width W1 and W2 are aligned and located in the detection area, and the first elongate section of the at least one turn having the width W1 is located in the disabled area and located in between the edge and the first elongate section of the at least one turn having the width W2.

19. The method of claim 18, wherein the step of detecting a position includes using a first detection method to detect a position indicated by the indicator in the detection area of the sensor and using a second detection method, different from the first detection method, to detect a position indicated by the indicator in the disabled area of the sensor.

20. The method of claim 19, wherein the first detection method is a three-point detection method that uses three position signals respectively received by three coils to calculate the position indicated by the indicator, and the second detection method is a two-point detection method that uses two position signals respectively received by two coils to calculate the position indicated by the indicator.

* * * * *